US012659587B2

(12) United States Patent
Moskovchenko et al.

(10) Patent No.: US 12,659,587 B2
(45) Date of Patent: Jun. 16, 2026

(54) ELECTRONIC IMAGE STABILIZATION OF UNMANNED AERIAL VEHICLE VIDEO STREAMS WITH INTENTIONAL MOTION HANDLING

(71) Applicant: Skydio, Inc., San Mateo, CA (US)

(72) Inventors: Stepan Moskovchenko, Belmont, CA (US); Dominic William Pattison, Cupertino, CA (US); Adam Parker Bry, Redwood City, CA (US)

(73) Assignee: Skydio, Inc., San Mateo, CA (US)

( * ) Notice: Subject to any disclaimer, the term of this patent is extended or adjusted under 35 U.S.C. 154(b) by 391 days.

(21) Appl. No.: 18/523,061

(22) Filed: Nov. 29, 2023

(65) Prior Publication Data

US 2024/0179410 A1     May 30, 2024

Related U.S. Application Data

(60) Provisional application No. 63/385,336, filed on Nov. 29, 2022.

(51) Int. Cl.
H04N 23/68 (2023.01)
B64U 101/30 (2023.01)
G06T 11/10 (2026.01)

(52) U.S. Cl.
CPC ........... H04N 23/683 (2023.01); G06T 11/10 (2026.01); H04N 23/681 (2023.01); H04N 23/6815 (2023.01); H04N 23/689 (2023.01); B64U 2101/30 (2023.01); B64U 2201/20 (2023.01)

(58) Field of Classification Search
CPC ............... H04N 23/683; H04N 23/681; H04N 23/6815; H04N 23/689; H04N 23/6811; H04N 23/6812; G06T 11/001; B64U 2101/30; B64U 2201/20
See application file for complete search history.

(56) References Cited

U.S. PATENT DOCUMENTS

| | | | | |
|---|---|---|---|---|
| 10,735,654 B1 * | 8/2020 | Jankowski | .............. | F42B 15/08 |
| 10,979,643 B1 * | 4/2021 | Jankowski | .............. | G06T 7/246 |
| 11,460,844 B2 * | 10/2022 | Martirosyan | ........ | G05D 1/0094 |
| 11,509,828 B1 * | 11/2022 | Jankowski | .............. | F42B 15/08 |
| 11,889,190 B1 * | 1/2024 | Jankowski | .............. | F42B 15/08 |
| 12,375,808 B1 * | 7/2025 | Jankowski | .............. | F42B 15/01 |

* cited by examiner

*Primary Examiner* — Sinh Tran
*Assistant Examiner* — Angel L Garces-Rivera

(57) ABSTRACT

Systems and methods for operating an unmanned aerial vehicle (UAV). A method includes capturing a raw video stream input using one or more camera sensors of the UAV. The method includes quantifying characteristics of motion of the UAV as commanded by a user of the UAV. The method includes quantifying characteristics of total motion of the one or more camera sensors including the motion commanded by the user. The method includes subtracting the characteristics of the motion commanded by the user from the characteristics of the total motion to generate a residual. The method includes applying electronic image stabilization to the raw video stream based on the residual to generate a stabilized video stream output. Accounting for unintended UAV motion in EIS separate and apart from the total motion being experienced by the UAV can significantly enhance a UAV user's video viewing experience.

20 Claims, 9 Drawing Sheets

FROM FIG. 5A

100

124

102

PRODUCE FOV IN RAW VIDEO STREAM INPUT

CROP FOV BY PERCENTAGE DEFINING MARGIN

127

FROM FIG. 5A

108

APPLY EIS BASED ON THIRD VECTOR

INSERT STABILIZATION VIEWPORT INSIDE PERIMETER OF FOV

126

128    122

COMPUTE OPPOSING VECTOR COUNTERACTING THIRD VECTOR

130

MOVE STABILIZATION VIEWPORT WITHIN MARGIN ACCORDING TO THIRD VECTOR

TO FIG. 5D

ELECTRONIC IMAGE STABILIZATION OF UNMANNED AERIAL VEHICLE VIDEO STREAMS WITH INTENTIONAL MOTION HANDLING

CROSS-REFERENCE TO RELATED APPLICATIONS

This application claims priority to and benefit of U.S. Provisional Patent Application Ser. No. 63/385,336, filed Nov. 29, 2022, and entitled "ELECTRONIC IMAGE STABILIZATION OF UNMANNED AERIAL VEHICLE VIDEO STREAMS WITH INTENTIONAL MOTION HANDLING," the contents of which are expressly incorporated by reference in its entirety for all purposes herein.

TECHNICAL FIELD

Various implementations of the present technology relate to unmanned aerial vehicles (UAVs) and, in particular, to electronic image stabilization techniques with intentional motion handling.

BACKGROUND

Unmanned aerial vehicles (UAVs, a.k.a. drones) find uses in a variety of applications by a variety of private, commercial and government users. At least some known UAV systems and associated operational techniques transmit image or video data wirelessly to ground stations during flight. Electronic image stabilization (EIS) may be utilized in an effort to stabilize streaming or stored video in response to UAV movements originating from a multitude of sources including both commanded (e.g., pilot initiated joystick movements) and unintentional motion (e.g., wind sheer or vibration, not directly controllable by the user of the UAV). In other words, EIS according to at least some known techniques may be applied to UAV video streams based on the total motion experienced by a UAV including both the unintended and largely uncontrollable motion from the exterior environment, as well the user-commanded motion. In some cases, application of EIS without distinguishing between the aforementioned two sources of UAV motion may negatively impact a UAV user's experience.

Accordingly, a need exists for technology that overcomes the problems demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following detailed description.

SUMMARY

The present technology provides systems, methods, and software for operating an unmanned aerial vehicle (UAV). A first aspect of the disclosure provides a method for operating a UAV. The method includes capturing a raw video stream input using one or more camera sensors of the UAV. The method includes quantifying characteristics of motion of the UAV as commanded by a user of the UAV. The method includes quantifying characteristics of total motion of the one or more camera sensors including the motion commanded by the user. The method includes subtracting the characteristics of the motion commanded by the user from the characteristics of the total motion to generate data representative of a residual of the subtracting. The method includes applying electronic image stabilization to the raw video stream based on the signal encoding data representative of the residual to generate a stabilized video stream output.

A second aspect of the disclosure provides a UAV system. The system includes one or more camera sensors for capturing a raw video stream input. The system includes at least one computing device disposed onboard the UAV and operably coupled to the one or more camera sensors. The at least one computing device is configured to quantify characteristics of motion of the UAV as commanded by a user of the UAV. The at least one computing device is configured to quantify characteristics of total motion of the one or more camera sensors including the motion commanded by the user. The at least one computing device is configured to subtract the characteristics of the motion commanded by the user from the characteristics of the total motion to generate data representative of a residual. The at least one computing device is configured to apply EIS to the raw video stream input based at least in part on the data representative of the residual to generate a stabilized video stream output.

A third aspect of the disclosure provides one or more non-transitory computer readable media. The one or more non-transitory computer readable media has stored thereon program instructions which, when executed by a computing device, cause a UAV to: quantify characteristics of motion of the UAV as commanded by a user of the UAV; quantify characteristics of total motion of the one or more camera sensors including the motion commanded by the user; subtract the characteristics of the motion commanded by the user from the characteristics of the total motion to generate data representative of a residual; and apply, based at least in part on the data representative of the residual, EIS to a raw video stream input captured by one or more camera sensors of the UAV to generate a stabilized video stream output.

Embodiments of the present technology provide for improved EIS for UAV video streams whereby the intended, user-commanded motion of the UAV is accounted for separate and apart from the total motion being experienced by the UAV. Doing so may substantially improve EIS performance as well as a UAV user's experience viewing streaming video. Notably, and as compared to conventional techniques, the present technology may substantially improve the ease with which the user can maintain an object of interest centered in a ground station display while simultaneously controlling flight maneuvers and/or movement of a UAV camera via a motorized gimble. Examples of embodiments of the present technology are provided and described in the Detailed Description with reference to the Drawings.

BRIEF DESCRIPTION OF THE DRAWINGS

One or more embodiments of the present invention are illustrated by way of example and not limitation in the figures of the accompanying drawings, wherein alphanumeric labels correspond to their mention in the Detailed Description.

Figure 1:
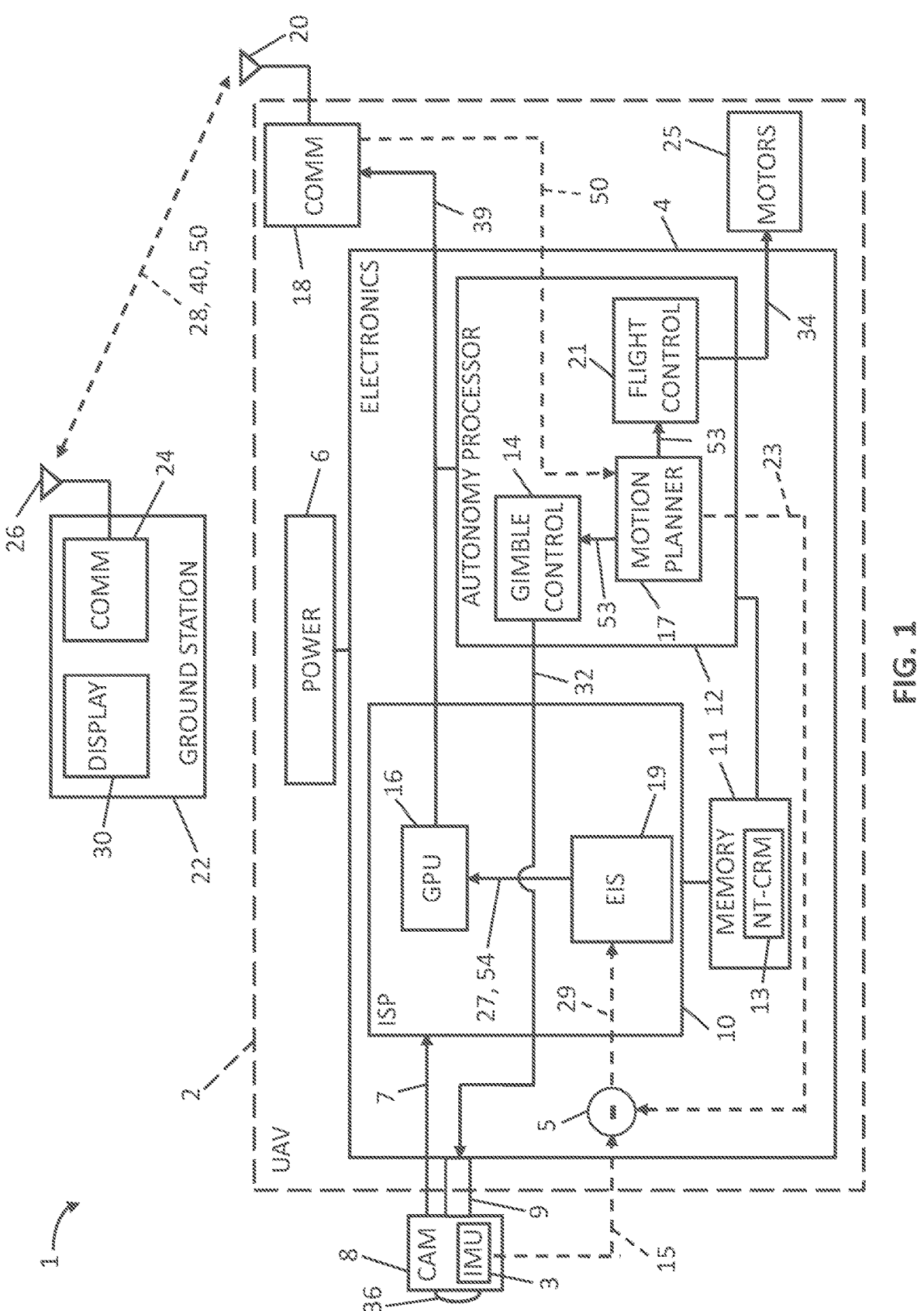
FIG. 1 depicts a block diagram of an unmanned aerial vehicle (UAV) system in accordance with some embodiments.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods, computing processes and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The present disclosure describes computing, communication and data storage systems, methods, and software providing for improved EIS for UAV video streams whereby the intended, user-commanded motion of the UAV is accounted for separate and apart from the total motion being experienced by the UAV, thus enhancing EIS performance, along with the UAV user's experience, as compared to conventional systems and methods. The embodiments of the present disclosure improve upon, and provide unique technical benefits to, technology fields including UAV-related systems and methods of operation involving image processing of video streams, and transmission thereof, from onboard camera sensors. The various technical benefits and effects of the disclosed embodiments are implemented specifically and exclusively in specialized computing, communication and data storage (e.g., memory) devices and systems. Although some such devices and their interconnections may be known to persons of ordinary skill in the art, their configuration and use as described herein provide an advantageous contribution to pertinent technical problems including, for example and without limitation, how to apply EIS more specifically to unintended motion of a UAV apart from motion that is intended (e.g., command) by the UAV user, according to the disclosed embodiments.

As will become apparent to persons skilled in the art, the disclosed embodiments are not merely process steps capable of being performed using generic computing devices, but which could be performed mentally or otherwise by a human being, including with the aid of pen and paper. Rather, the unique algorithms described herein are required to be encoded in software or firmware instructions to direct (e.g., "cause") the physical actions of the various computing, communications and data storage devices in a manner believed to be as yet unknown in the pertinent technological field. These physical effects and actions include, without limitation, transmission of encoded data as signals over wired or wireless communication channels, both within one particular computing device and over great distances over spans of the Earth or outer space. The described algorithms direct data to be stored according to received data inputs originating from camera sensors of the UAV and from a ground station utilized for piloting the UAV, among other purposes. All of these actions, and numerous others that are described herein, are performed by physical computing and communication devices, as directed by the disclosed algorithms.

Furthermore, the physical actions which are specifically caused to occur using computing devices having processors taking as commands encoded software or firmware instructions stored in non-transient computer-readable storage media are performed and coordinated thereby in substantially real-time. Real-time is defined as a very nearly instantaneous result of an input, stimulus, or computation performed by a computing device as described herein, where the timing of a subsequent action is limited only by the physical makeup or design of the computing device and communications network. For example, a duration between a time upon which a result of a first computation is generated by a first networked computing device a time between that result becomes available for a subsequent computation by a second networked computing device may be limited only by a transmission time required by the physical medium of the wired, optical or wireless network connecting the first and second computing devices. Such operations are commonly modeled in the art a occurring instantaneously, or at the speed of light, for example, or otherwise at speeds that a human mind or a person using pen and paper could not achieve.

A person having ordinary skill in the art will recognize and appreciate that not only are the disclosed algorithms incapable of being performed mentally by a human being, they are certainly not capable of being performed mentally with the aid of pen and paper in real time, or otherwise by a human being within a time sufficient to provide both the disclosed technical advantages and effects, and the improved user experience, in the practical application to the pertinent technological field.

More particularly, the disclosed embodiments enable an improved EIS for UAV video streams whereby the intended, user-commanded motion of the UAV is accounted for separate and apart from the total motion being experienced by the UAV. Doing so may substantially improve EIS performance as well as a UAV user's experience viewing streaming in-flight video. As one example, the disclosed systems, methods and software for operating a UAV improve upon conventional EIS of video streams captured by UAV camera(s) by providing substantially improved EIS techniques enabling the user to maintain an object of interest centered in an electronic display device while simultaneously controlling flight maneuvers and/or movement of a UAV camera via a motorized gimble.

FIG. 1 depicts a block diagram of a UAV system 1 in accordance with some embodiments. UAV system 1 may include a UAV 2 with on-board electronics 4. UAV 2 may also include an electric power source 6, such as a rechargeable battery pack, operably coupled to electronics 4 to supply power thereto during operation of UAV 2. UAV 2 may include one or more camera sensors 8, such as redgreen-blue (RGB) type camera(s) and/or infrared (IR) camera(s), for obtaining still image and/or video streams during operation of UAV 2. Electronics 4 may include one or more integrated circuits having various functionality for implementing the present technology as described herein. In some embodiments, electronics 4 is essentially a single integrated circuit, while in other embodiments, electronics 4 may include a plurality of different but interconnected integrated circuits, where each integrated circuit may provide a separate, or subset of, functionality to electronics 4 for implementing the present technology. As used herein, module or modules may refer to a functional block or set of interconnected blocks of electronics 4, where such module(s) may include digital and/or analog electronic components of the wider electronics 4 of UAV 2, and which may further include computing and memory data storage devices that may be dedicated for use by specific modules, or which may be shared amongst two or more modules of electronics 4. Such structure and function of module(s) of electronics 4 according to the present technology is expected to become fully apparent to persons having ordinary skill in the art upon further study of the disclosure.

Electronics 4 may include an image signal processor (ISP) module 10 operably coupled in communication with camera sensor(s) 8. Electronics 4 may also include an autonomy processor (AP) module 12 operably coupled in communication with ISP module 10. Electronics 4 may further include at least one memory data storage device ("memory" for short) 11 operably coupled in communication with ISP module 10 and/or AP module 12. Memory 11 may be capable of storing image data including such data generated by camera sensor(s) 8. Memory 11 may be capable of permanently storing such data in a format that is readable by devices and systems operable by a user of UAV 2 that are external to UAV 2. For example, and without limitation, memory 11 may at least in part be embodied in a removable disk, such as a SECURE DIGITAL (SD) card. As another example, a user of UAV 2 may read image or video data from memory 11 using a wired (e.g., serial) connection such as universal serial bus (USB). Memory 11 may store configuration data for use during operation of UAV 2 according to the present technology. Memory 11 may include one or more non-transient computer readable media (NT-CRM) 13. NT-CRM 13 may have stored thereon program instructions as, for instance, software and/or firmware code in assembled and compiled form for use by computing device(s) such as one or more processors of electronics 4 to implement, execute, or otherwise facilitate various useful operations and algorithms during operation of UAV 2 according to the present technology.

UAV 2 includes various mechanical and other electronic components like motors and associated controllers for flight. These are not shown in FIG. 1 as they exceed the scope and spirit of this disclosure. Persons having ordinary skill in the art are expected to be able to readily envision such components and their usage in conjunction with the present technology, which may find advantageous application in a wide array of types of UAVs and similar vehicles, even ground, water or space-based vehicles, beyond those commercially available or in development by the Applicant.

UAV 2 may include a communications interface 18 operably coupled in communication with ISP module 10. In some embodiments, communications interface 18 may also be coupled in communication with AP module 12. In some embodiments, communications interface 18 may include one or more radio frequency (RF) antenna(s) 20. Communication interface 18 may be embodied in an RF transceiver capable of transmitting and receiving signals encoding various types of data useful to system 1 during operation of UAV 2. In some embodiments, communication interface 18 utilizes WiFi communication protocols for its transceiver functionality. System 1 may also include a ground station 22. Ground station 22 may include a communication interface 24 for communicating, e.g., via RF antenna(s) 26 using WiFi, with UAV 2. In some embodiments, ground station 22 may also include an electronic display device 30 providing user(s) of system 1 the ability to see video from captured camera sensor(s) 8 in real time by way of an RF communications link 28 established between communication interface 24 and communication interface 18.

Each of the one or more camera sensors 8 may include a lens 36. In some embodiments, lens 36 may be a wide angle lens. Lens 36 may have a shape and/or material of construction, among other physical and/or optical properties, to focus visible or other (e.g., IR) light onto sensor(s) 8 to produce a digital representation of an image by way of transduction of the energy of the light into a digital representation in data that may be stored and transmitted. As described below, some embodiments of the present technology may account for such aforementioned physical and/or optical properties of the lens 36 in applying EIS and related image processing techniques. Camera sensor(s) 8 may include or be coupled to at least one motion sensor to detect properties of linear and/or angular motion (e.g., direction and magnitude of acceleration) of camera sensor(s) 8. In an example, such motion sensor(s) may include or be embodied in at least one inertial measurement unit (IMU) 3.

ISP module 10 may receive a raw video stream input 7 from camera sensor(s) 8 as image data. ISP module 10 may include a graphics processing unit (GPU) 16 and an EIS module 19 operably coupled in communication with GPU 16. AP module 12 may include a motion planner module 17, a flight control module 21, and a gimble control module 14. Motion planner module 17 may be operably coupled in communication with gimble 14 and flight control 21 modules, as well as with communications interface 18. UAV 2 may include one or more electric motors 25 operably coupled in communication with flight control module 21. Such motor(s) 25 may turn one or more rotors at a speed sufficient to provide motive force to enable UAV 2 to achieve flight under control of the user at ground station 22. UAV 2 may also include a motorized gimble 9 operably coupled to and between camera sensor(s) 8 and a portion of UAV 2.

In some embodiments, UAV 2 user (e.g., pilot) manipulates a joystick and/or other control means at ground station 22 according to a desired direction or path of movement of UAV 2 during flight. The aforementioned manipulations by the user may be translated into a signal 50 transmitted from ground station 22 encoding data representative of the characteristics of motion of the UAV 2 as commanded by the user. Signal 50 may be received by communications interface 18 of UAV 2 and relayed to motion planner module 17. Motion planner module 17 may then translate the data encoded by signal 50 into intermediate signals 53 and pass those to gimble 14 and flight 21 control modules for use in finally implementing the user-command motion of motor(s) 25 and/or gimble 9 during operation of UAV 2. For that purpose, gimble control module 14 may transmit a gimble control signal 32 to gimble 9, and flight control module 21 may transmit a flight control signal 34 to motor(s) 25.

Electronics 4 may include a subtractor module 5 operably coupled in communication with IMU 3, motion planner module 17 and EIS module 19. Subtractor module 5 may take as one of its two inputs data 15 representative of characteristics of total motion of the one or more camera sensors 8 including the aforementioned motion commanded by the UAV 2 user (e.g., as represented by signal 50). As its second input, subtractor module 5 may take data 23 representative of characteristics of user-intended (e.g., commanded) motion of UAV 2 and/or gimble 9. In some embodiments, data 23 may be embodied in, or may include, user-intended angular motion data of UAV 2 (e.g., to be, or as, effectuated by motor(s) 25) and/or user-intended angular motion data of camera sensor(s) 8 (e.g., to be, or as, effectuated by gimble 9).

Subtractor module 5 may provide as its output data representative of a difference between the aforementioned two inputs to subtractor module 5. That difference may be referred to herein as a residual 29. As described in greater detail below with reference to subsequent figures, in operation of system 1, EIS 19 may take residual 29 as its input, perform a first set of image processing or other operations according to the present technology, and then output mesh data 27 and/or texture map data 54 to GPU 16. GPU 16 may implement a second set of image processing or other operations according to the present technology to yield a stabilized video stream output 39. Communications interface 18 may receive the stabilized video stream output 39, and then wirelessly transmit a signal 40 encoding data representative of the stabilized video stream output 39 to ground station 22 for viewing on its display 30.

Figure 2:
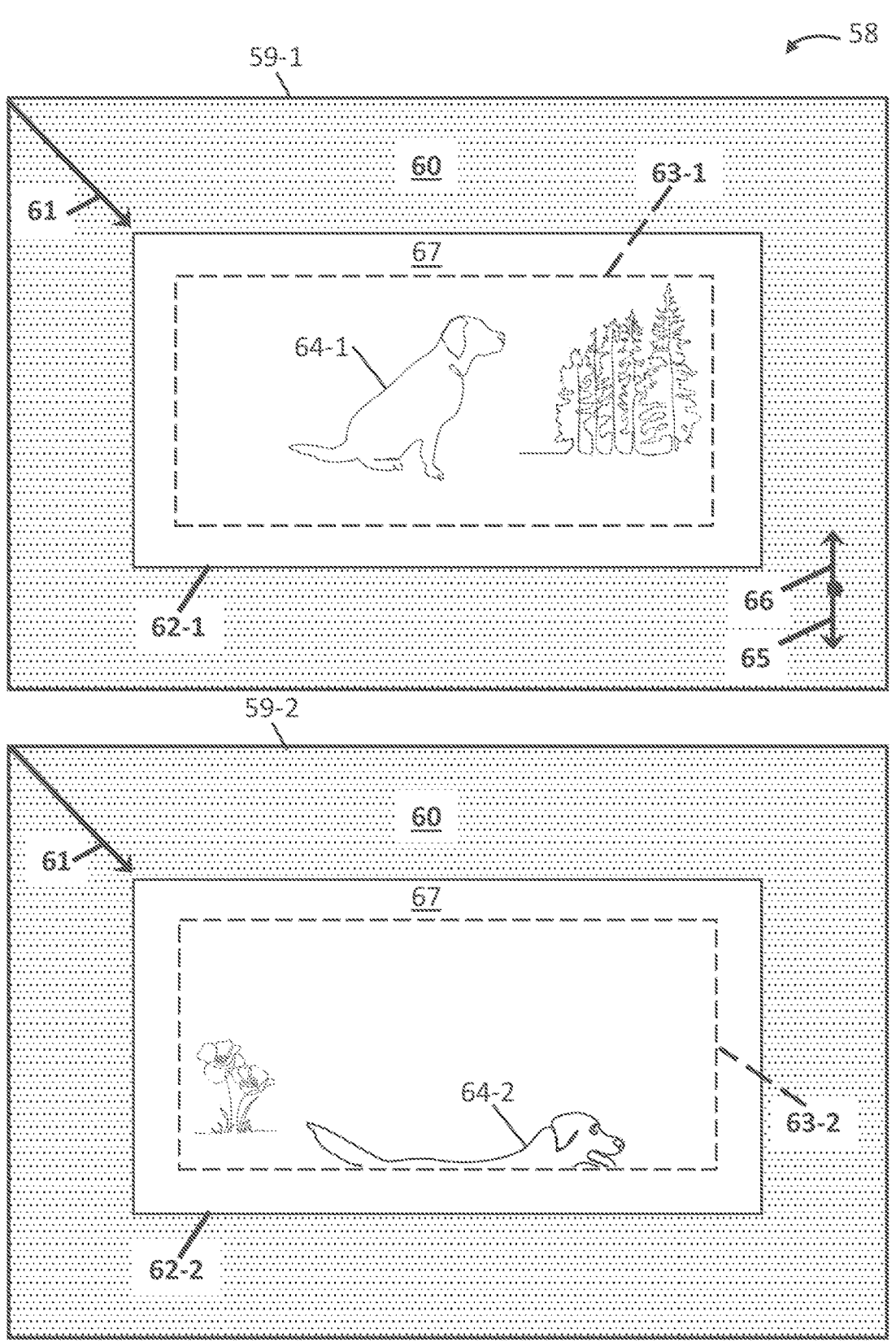
FIG. 2 depicts a block diagram of an electronic image stabilization process according to a known implementation.

FIG. 2 depicts a block diagram of a zoom and electronic image stabilization process 58 according to a known implementation. As with the present technology, known EIS process 44 may utilize image processing algorithms in conjunction with total UAV motion data provided by one or more motion sensors on board the UAV. However, EIS process 58 may not distinguish between characteristics of the total motion of UAV (e.g., unintended vibration or shaking plus intended UAV flight maneuvers), or more specifically of camera sensor(s) thereof, and characteristics of the UAV user-commanded of UAV and/or gimble motion. As all such motion is detected by motion sensors like IMUs, EIS process 58 is applied to all of the total motion to stabilize image frames of video ultimately displayed at the ground station.

FIG. 2 demonstrates a use case with EIS process 58 whereby not distinguishing between characteristics of the total motion of UAV and characteristics of the UAV user-commanded motion may be problematic for users. Prior to receipt of a raw video input stream to EIS process 58, a first window 59-1 representing image data captured by UAV camera sensor(s) may be zoomed to a zoom level 61 such that pixels 60 are dropped, thereby resulting in a first field of view (FOV) 62-1. Next, EIS process 58 inserts a first stabilization viewport 63-1 inside a perimeter of first FOV 62-1 with a margin 67 separating them. In the use case, the state of affairs inside of window 59-1 is a result of the UAV user commanding both the zoom level 61 and UAV and/or gimble motion to view video of an object (e.g., sitting dog 64-1) centered on a screen of an electronic display device at ground station or elsewhere. What the user sees is the pixel content of stabilization viewport 63-1.

The UAV in this use case for EIS process 58 may experience shaking, vibration, veering (e.g., as by wind), and the like, each of which is unintended motion detected by the motion sensor(s) of the UAV, in addition to user-commanded motion. So, for example, EIS process 58 may take this quantified total motion and compute a vector 65 having a direction and magnitude representing the aforementioned total motion. EIS process 58 may then compute an opposing vector 66 having a direction and magnitude opposite that of vector 65. The aforementioned unintended motion may be occurring simultaneously with user-commanded motion, such as the user would desire when, for example, following object (e.g., a walking dog 64-2) that is moving after having been previously stationary.

While attempting to follow walking dog 64-2 object and maintain that object centered in a second window 59-2 at the same zoom level 61, EIS process 58 may apply the opposing vector 66 according to the total motion data. A second stabilization viewport 63-2 will be provided in a second FOV 62-2 separated by margin 67 in like manner as described above. In the use case for EIS process 58, the UAV user may have difficulty maintaining the walking dog 64-2 object centered in the second stabilization viewport 63-2 due to EIS process 58 not distinguishing between characteristics of the total motion of UAV and characteristics of the UAV user-commanded motion. In the example, accounting for the different sources of UAV motion results in an overcorrection, with the first stabilization viewport 63-1 being moved too far downward to the position of the second stabilization viewport 63-2. Thus, only a portion of the walking dog 64-2 object may be visible, it will not be adequately centered in second stabilization viewport 63-1 as desired and commanded, and the user will need to continually apply corrective actions at the ground station with some level of frustration. Accordingly, in cases such as depicted in FIG. 2, EIS may be less effective in the known process 58 and a UAV user's experience may be negatively impacted. Example beneficial and advantageous technical effects in this regard of embodiments of the present technology are described below.

Back to FIG. 1 and the present technology, in an example, subtractor module 5 in conjunction with operations by ISP module 10 and its constituent components may operate to address the undesired issues of the known EIS process 58 as described above with reference to FIG. 2. Notably, the present technology may provide the various improvements upon known process 58 over all zoom levels UAV 2 is capable of providing (e.g., 1× to 16× zoom).

Figure 3:
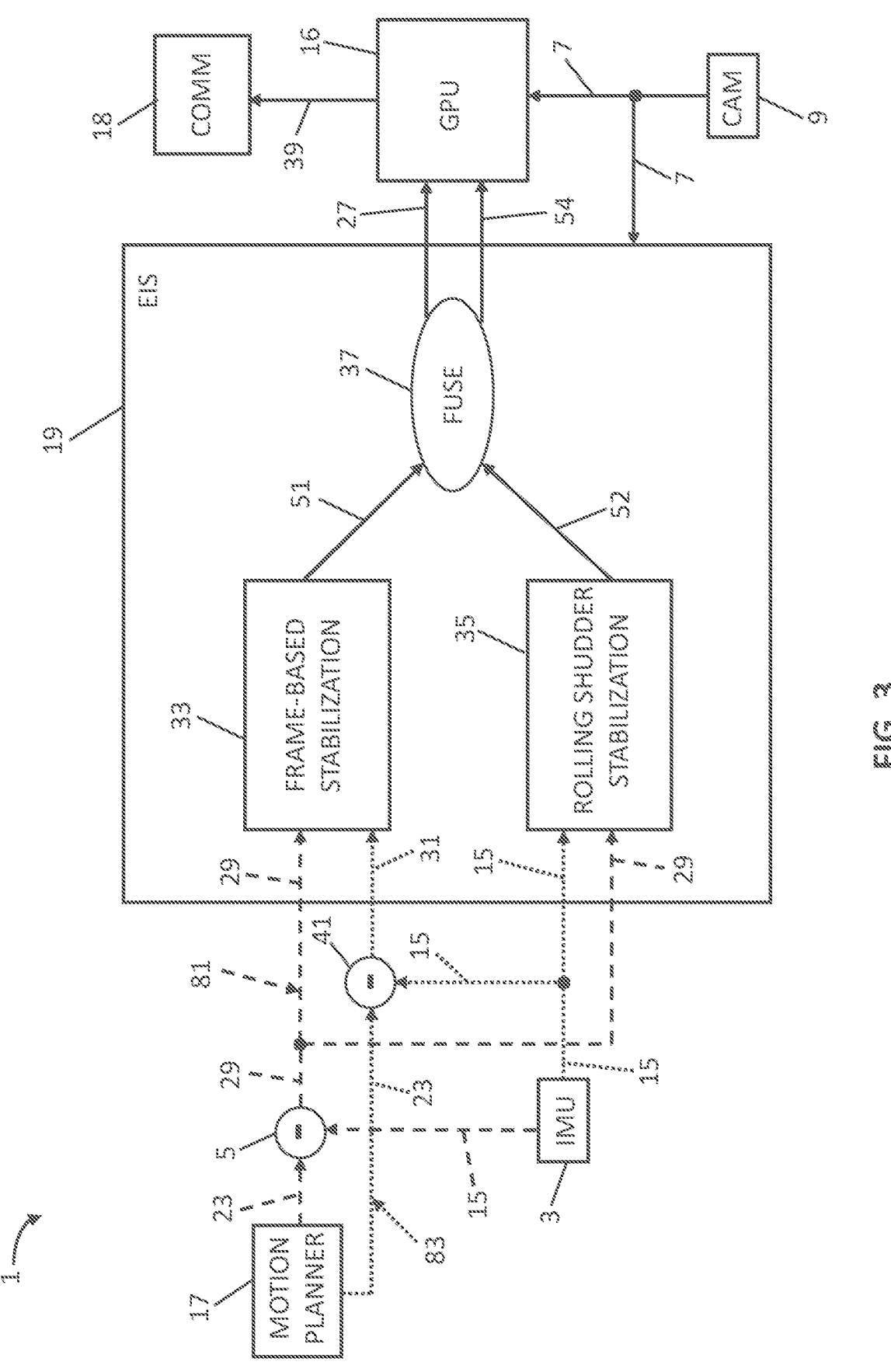
FIG. 3 depicts a block diagram of aspects of the UAV system of FIG. 1 in accordance with some embodiments.

FIG. 3 depicts a block diagram of aspects of the UAV 2 system 1 of FIG. 1 in accordance with some embodiments. ISP module 10, and more specifically EIS module 19 in an example, may include analog and/or digital electronics to implement EIS image processing algorithms according to the present technology in a dual scheme. In an example, ISP module 19 is or includes a system-on-a-chip (SOC). In some embodiments, GPU 16 is implemented as hardware and EIS module 19 may be implemented as software and/or firmware that may utilize at least one system 1-wide, or EIS-specific, processor having one or more central processing units (CPUs) that may execute EIS and related image processing operations that are at least in part encoded as program instructions stored in NT-CRM 13. In an example, GPU 16 and/or EIS module 19 and their component parts including one or more computing devices may utilize direct memory access (DMA) components and techniques (not shown in FIGS. 1 and 3) to ensure high performance of operations according to the present technology.

EIS module 19 may include a frame-based stabilization module 33, a rolling shudder stabilization module 35 and a fusion module 37. In a first example of a software or firmware implementation of EIS module 19, only the residual 29 data may be passed from subtractor module 5 to both of the frame-based 33 and rolling shudder 35 modules for use in their respective EIS image processing algorithms.

In some embodiments, electronics 4 includes a subtractor module 41 either instead of, or in addition to, subtractor module 5. Subtractor module 41 may take as its two inputs: (1) the data 23 representative of characteristics of user-intended (e.g., commanded) motion of UAV 2 and/or gimble 9 from motion planner module 17; and (2) the data 15 representative of characteristics of the above described total motion from IMU 3. In a second example software or firmware implementation of EIS module 19, also shown in FIG. 3, data representative of a residual 31 (e.g., numerical difference between the values of data 41 and data 15) may be passed by subtractor module 41 only to frame-based stabilization module 33 for use in its respective EIS image processing algorithm(s). Residual 31 data is not passed to rolling shudder based stabilization module 35 in this second example. Instead, IMU 3 may pass the data 15 representative of characteristics of the total motion directly to rolling shudder stabilization module 35 for use in its respective EIS image processing algorithm(s).

In either of the above described first or second software or firmware implementation examples of EIS module 19, frame-based stabilization module 33 may output data 51 representative of a position of a stabilization viewport 73 within a margin 77, and rolling shudder stabilization module 35 may output data 52 representative of one or more slant properties 79 of the stabilization viewport 73, as described below with reference to FIG. 4. The position data 51 and slant data 79 may be passed to fusion module 37 to generate mesh data 27 and/or texture map data 54, which may then be passed to GPU 16 for use thereby according to the present technology. Mesh data 27 may include an array of values that at least preliminarily describe a shape and slant of a stabilization viewport 73 and/or margin 77, as further described below with reference to FIG. 4.

As described below with reference to FIGS. 4 and 5A-5D, either or both of EIS module 19 and GPU 16 may compute a vector 75 based at least in part on residual 29 (or residual 31), and may additionally compute an opposing vector 76 to counteract the effects of vector 75 in terms of both direction and magnitude to stabilize a shaky image. In an example, mesh data 27 and/or texture map data 54 may describe the opposing vector 76 for use by GPU 16. Vector 75 may also be referred to herein as third vector 75. EIS module 19 and/or GPU 33 may produce the stabilization viewport 73 initially based upon mesh data 27, and then move the viewport 73 in a direction, and to an extent, according to the aforementioned opposing vector 76.

The stabilization viewport 73 may have a more complex shape than simply a square cornered rectangle. In some embodiments, EIS module 19 and/or GPU 16 may shape the stabilization viewport 73 for EIS more complexly, as by accounting for lens 36 physical and/or optical properties, and lens 36 infringement and/or rolling shudder behavior. EIS module 19 and its component parts and software/firmware may read such properties and parameters describing lens 36 infringement behavior from memory 11, for example.

In some embodiments, operations performed by EIS module 19 and GPU 16 are not merely a simple crop and scale. Rather, the mesh data 27 and/or texture map data 54 may be used to create a texture map in individual, or across a plurality of, frames of the video stream data of interest. For example, and without limitation, GPU 16 may slant, stretch and/or deform the stabilization viewport according to mesh data 27 and/or texture data 54 and the aforementioned vectors 75 and 76. GPU 16 is particularly suited to this sort of image processing because its specialization and speed ensure that such operations take place quickly enough and with low enough latency to provide continual high quality video streams to UAV 2 user that are stabilized in the desired manner.

The systems and methods according to the present technology may be described as complex cropping, with mesh data 27 and/or texture map data 54 being used, at least in part, to describe dynamic shaping of the stabilized viewport 73 over time. As such, the processes according to the present technology may be performed iteratively and, in some cases, in parallel. In some embodiments, GPU 16 and/or EIS module 19 and its component parts utilize DMA components and techniques (not shown in FIGS. 1 and 3) to ensure high performance operations according to the present technology.

Referring again to FIG. 1, ground station 22 may be embodied in one of several types of machines. One example ground station 22 is a smartphone running a specialized application for piloting UAV 2 and viewing video therefrom. In the smartphone, or likewise laptop, case, the application may be capable of drawing annotations as part of rendering video on display 30. In another example, ground station 22 may be embodied in a machine that is not fully, or even partially, capable of drawing annotations on video. Whereas a smartphone application may be designed to be used effectively with a specific UAV 2 as its ground station 22 including for annotations of video, a ground station 22 not having that capability may still be utilized to display video from UAV 2 to users. Enabling such other ground stations 22 to be used to pilot UAV 2 and view video therefrom is advantageous because it may expand the reach of useful applications that UAV 2 may be used for (e.g., police, military, fire, search & rescue, etc.) where smartphones with tailored applications may be unavailable.

Figure 4:
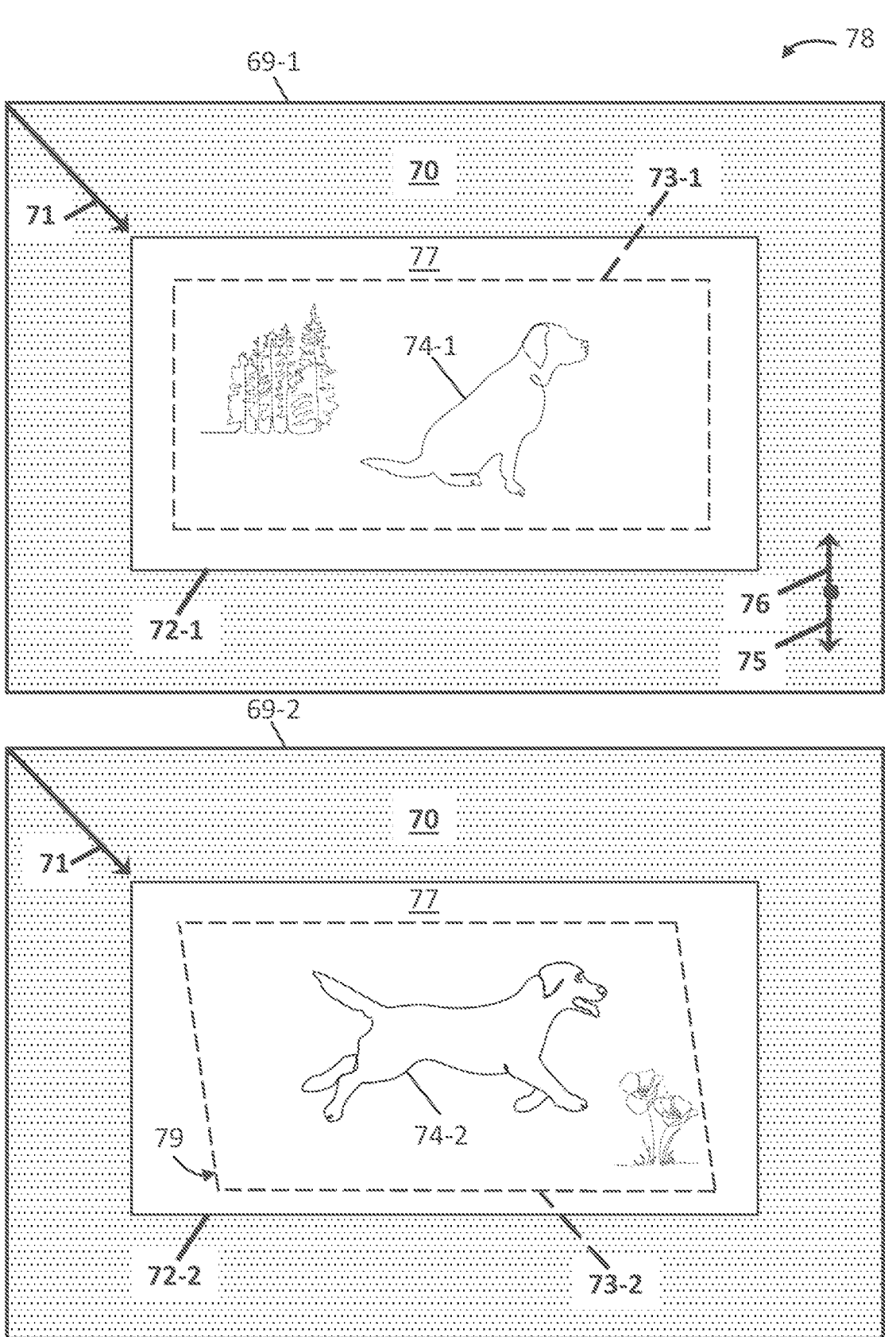
FIG. 4 depicts a block diagram of an electronic image stabilization process in accordance with some embodiments.

FIG. 4 depicts block diagrams of an EIS process 78 in accordance with some embodiments. The present technology implemented by, for example, system 1, utilizes image processing algorithms in conjunction residual 29 (or residual 31) data, and in some embodiments, also total UAV motion data 15 provided by IMU 3 to perform process 78. As used in process 78, EIS module 19 and/or GPU 16 distinguish(es) between characteristics of the total motion of UAV 2 (e.g., unintended vibration or shaking plus intended UAV flight maneuvers), or more specifically of camera sensor(s) 8 thereof, and characteristics of the user-commanded of UAV 2 and/or gimble 9 motion. Although all such motion is detected by IMU 3, and in contrast to known process 58, EIS process 78 is not ultimately applied to all of the total motion to stabilize image frames of the raw video input stream 7 ultimately displayed to the UAV 2 user at the ground station 22.

FIG. 4 demonstrates a use case with EIS process 78 in comparison with process 58 of FIG. 2 to demonstrate at least some of the advantageous technical effects of the systems and methods according to the present technology that are of benefit to UAV 2 users. Distinguishing between characteristics of the total motion of UAV 2 and characteristics of the UAV 2 user-commanded motion in process 78 may substantially improve the user experience as compared to, for example and without limitation, the analogous use case for process 58 shown and described above with reference to FIG. 2.

Prior to receipt of the raw video input stream 7 by EIS module 19 in EIS process 78, a first window 69-1 representing image data of raw video stream input 7 captured by UAV 2 camera sensor(s) 8 may be zoomed by a zoom level 71. Pixels 70 may be dropped, thereby resulting in a first FOV 72-1. Next, EIS process 78 inserts a first stabilization viewport 73-1 inside a perimeter of first FOV 72-1 with a margin 77 separating them. In this use case, the state of affairs inside of window 79-1 is at least partly a result of the UAV user commanding both the zoom level 71 and UAV 2 and/or gimble 9 motion to view video of an object (e.g., sitting dog 74-1) centered on a screen of the electronic display device 30 at ground station 22. What the user sees is the pixel content of stabilization viewport 73-1.

The UAV 2 in this use case for EIS process 78 may experience shaking, vibration, veering (e.g., as by wind), and the like, each of which is unintended motion detected by the IMU 3, in addition to the intended, user commanded motion. In some embodiments, EIS process 78 may use the residual 29 computed as described above with reference to FIGS. 1 and 2, and the residual 29 is then utilized by EIS module 19 and/or GPU 16 to compute a vector 75 having a direction and magnitude representing only, or at least approximately, characteristics of the aforementioned unintended motion. EIS process 78 may then compute an opposing vector 76 having a direction and magnitude opposite that of vector 75. The aforementioned unintended motion may be occurring simultaneously with user-commanded motion, such as the user would desire to, for example, follow object (e.g., a walking dog 74-2) that is moving after having previously been stationary.

While user is maneuvering UAV 2 from ground station 22 to follow walking dog 64-2 object and maintain that object centered in a second window 79-2 at the same zoom level 71, EIS process 78 will apply the opposing vector 76. A second stabilization viewport 73-2 will be provided in a second FOV 72-2 separated by margin 77 in like manner as described above for the first stabilization viewport 73-1. As compared to the known EIS process 58, in the use case for process 78, the UAV 2 user may find it significantly less difficult to maintain the moving object (e.g., walking dog 74-2) centered in the second stabilization viewport 73-2 due to EIS process 78 distinguishing between characteristics of the unintended motion of UAV 2 and characteristics of the UAV user-commanded motion using the subtractor module(s) 5 and/or 41 according to the present technology. This eliminates, or at least mitigates, the tendency to over-correct as described above for known EIS process 58. Thus, the first stabilization viewport 73-1 may be moved by only, or at least approximately, the extent reflecting of the user intended UAV 2 motion, but not the total motion including unintended UAV 2 motion as in EIS process 58. Additionally, slant properties 79 and possibly other properties may be applied to the shape of stabilization viewport 73-2 and possibly also future frames going forward in time to facilitate the UAV 2 user maintaining the moving object 74-2 centered and clearly visible on the ground station 22 display 30.

As a result of EIS process 78 implemented by the systems and methods according to the present technology, all- or more as compared to second stabilization viewport 69-2 shown in FIG. 4 of walking dog 74-2 object will be centered in stabilization viewport 73-3 more in line with the expectations and desires of the user manipulating various controls at ground station 22. Accordingly, in cases such as that depicted in FIG. 4, EIS may be more effective in the process 78 a compared to the known EIS process 58, and a UAV 2 user's experience may be significantly improved. Further beneficial and advantageous technical effects in this regard are described below with reference to FIGS. 5A-5D.

Figure 5A:
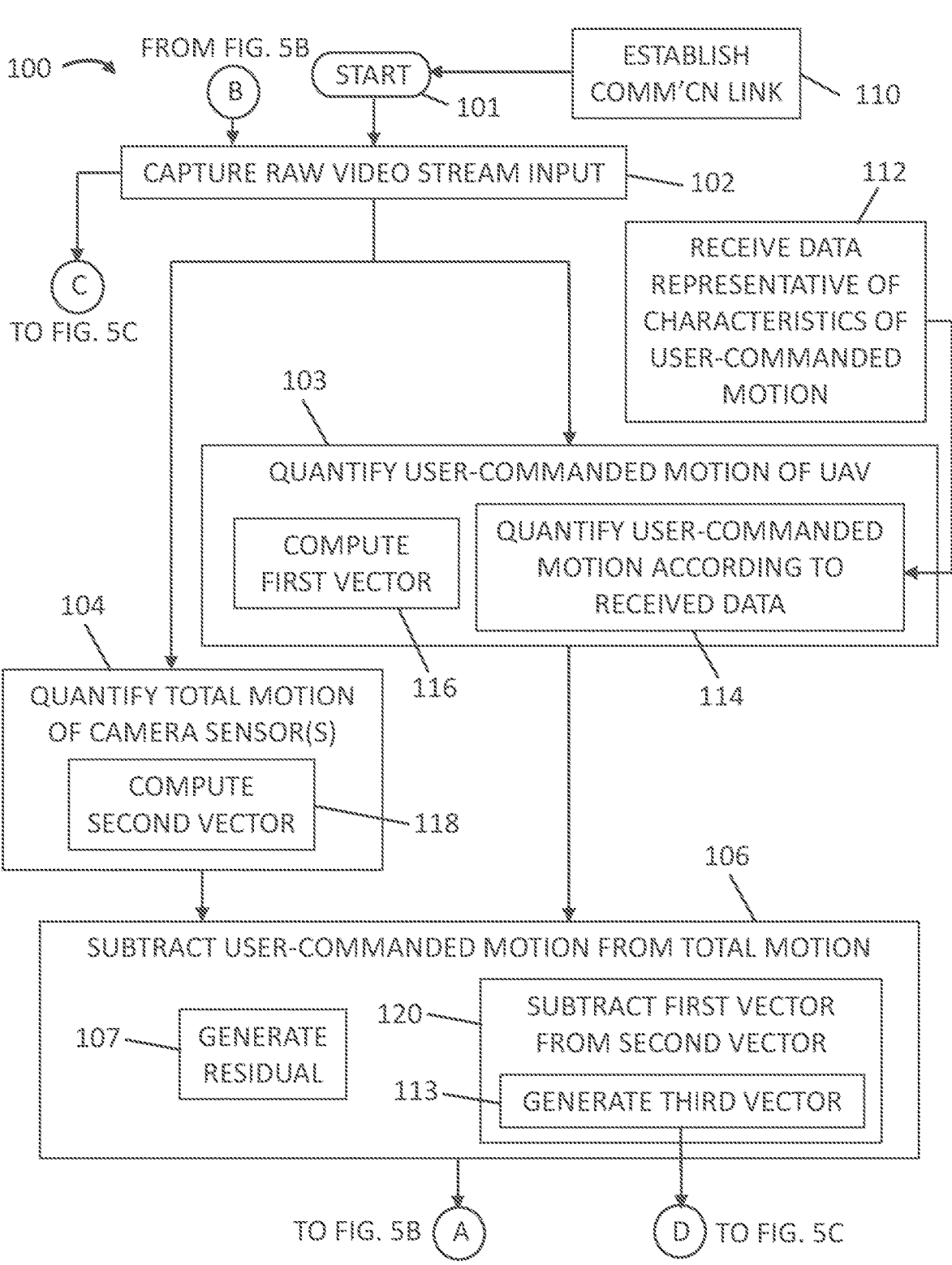
FIGS. 5A-5D depict flow charts of a method for operating the UAV system and associated process shown in FIGS. 1, 3 and 4 in accordance with some embodiments.

FIGS. 5A-5D depict flow charts of a method 100 for operating UAV system 1 and associated process 78 shown in FIGS. 1, 3 and 4 in accordance with some embodiments. Referring now to FIG. 5A, and with further reference back to FIGS. 1, 3 and 4, and their description above, method 100 may commence from a start state 101. In an example, start state 101 may correspond to the UAV 2 being powered on following a period of being powered off or being in a sleep or other low power consumption mode of operation. In another example, method 100 may include the step of establishing 110 (e.g., using WiFi) communications link 28 between UAV 2 and ground station 22, and start state 101 may additionally, or instead, correspond to communications link 28 being effectively established 110.

Method 100 may include the step of capturing 102 raw video stream input 7 using camera sensor(s) 8. Method 100 may also include the step of quantifying 103, e.g., by computing device(s) and/or software (or firmware) of UAV 2 such as EIS module 19 and/or GPU 16, characteristics of motion of the UAV 2 as commanded by the UAV 2 user. Method 100 may further include the step of quantifying 104 characteristics of total motion of the one or more camera sensors 8 including the aforementioned motion commanded by the UAV 2 user.

In some embodiments, method 100 may include the step of receiving 112, e.g., using communications interface 18 and via communications link 28, signal 50 encoding data representative of the characteristics of motion of the UAV 2 as commanded by the user. In those embodiments, the quantifying 103 step of method 100 may include quantifying 114 the characteristics of the UAV 2 user-commanded motion according to the data encoded by signal 50. Method 100 may also include the step of subtracting 106 the characteristics of the motion commanded by the user from the characteristics of the total motion to generate 107 data—or a signal encoding it—representative of the residual 29 (or residual 31) of the subtracting 106.

Figure 5B:
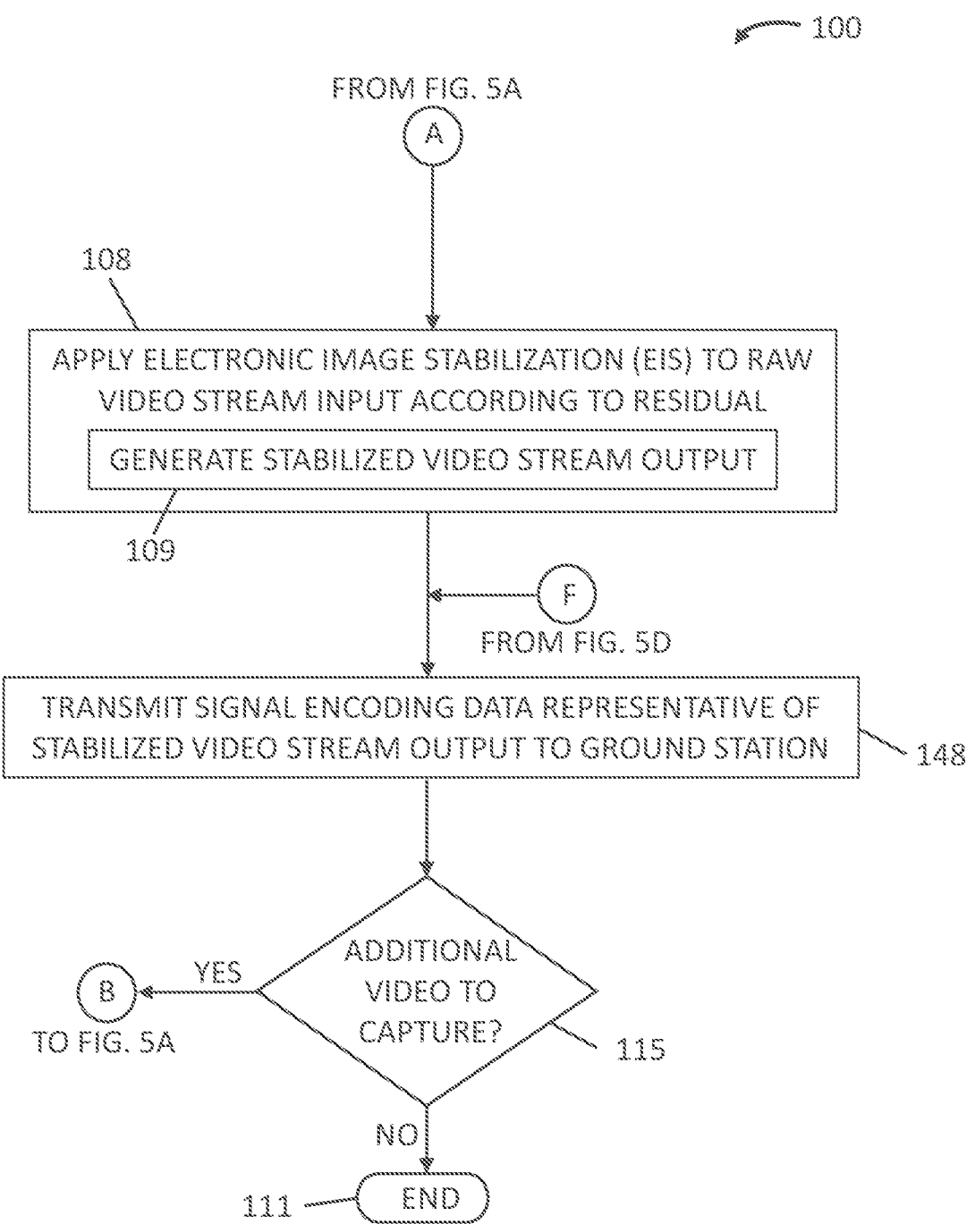

Referring now to FIG. 5B, and transitioning thereto from FIG. 5A via the circled letter "A," method may further include the step of applying 108 EIS to raw video stream input 7 based at least in part on the residual 29 (or residual 31) to generate 109 stabilized video stream output 39. From the applying 108 step, method 100 may proceed to the step of transmitting 148 the signal 40 encoding data representative of the stabilized video stream output 39 to ground station 22 via communications link 22. After, or concurrently with, performance of either the transmitting 148 step in method 100, the process may proceed to a logical branch 115, whereby communications interface 18 and/or computing device(s) of UAV 2 system 1 may identify whether or not there is additional video to be captured (e.g., by camera sensor(s) 8) and processed according to the present technology. This identification in method 100 may include determining if additional video stream data is incoming to ISP module 10 and/or AP module 12.

Where additional video to be captured is not identified at logical branch 115, method 100 may proceed to an end state 111. In an example, where there is no additional video to be captured 102 in method 100, electronics 4 or part of the above described components thereof, may enter a powered off or low power (e.g., sleep) mode for the end state 111. In another example, method 100 may proceed to the end state 111 by the action of a user of UAV 2, as in turning its power off. Alternatively, where additional video to be captured is identified at logical branch 115, method 100 may proceed to iterate through the process described above with reference to the foregoing figures, transitioning from FIG. 5B back to FIG. 5A via the circled letter "B."

Referring again to FIG. 5A, the method 100 step of quantifying 103 the characteristics of the motion commanded by the user may include computing 116 a first vector representative of the user-commanded motion. In some embodiments, the method 100 step of quantifying 104 the characteristics of the total motion (e.g., of the one or more camera sensors 8) may include computing 118 a second vector representative of the characteristics of the total motion. The subtracting 106 step of method 100 may include subtracting 120 the first vector from the second vector to generate 113 data—or a signal encoding it—representative of a third vector 75 defining the residual 29 (or residual 31) of the subtracting 106 (or subtracting 120).

Figure 5C:
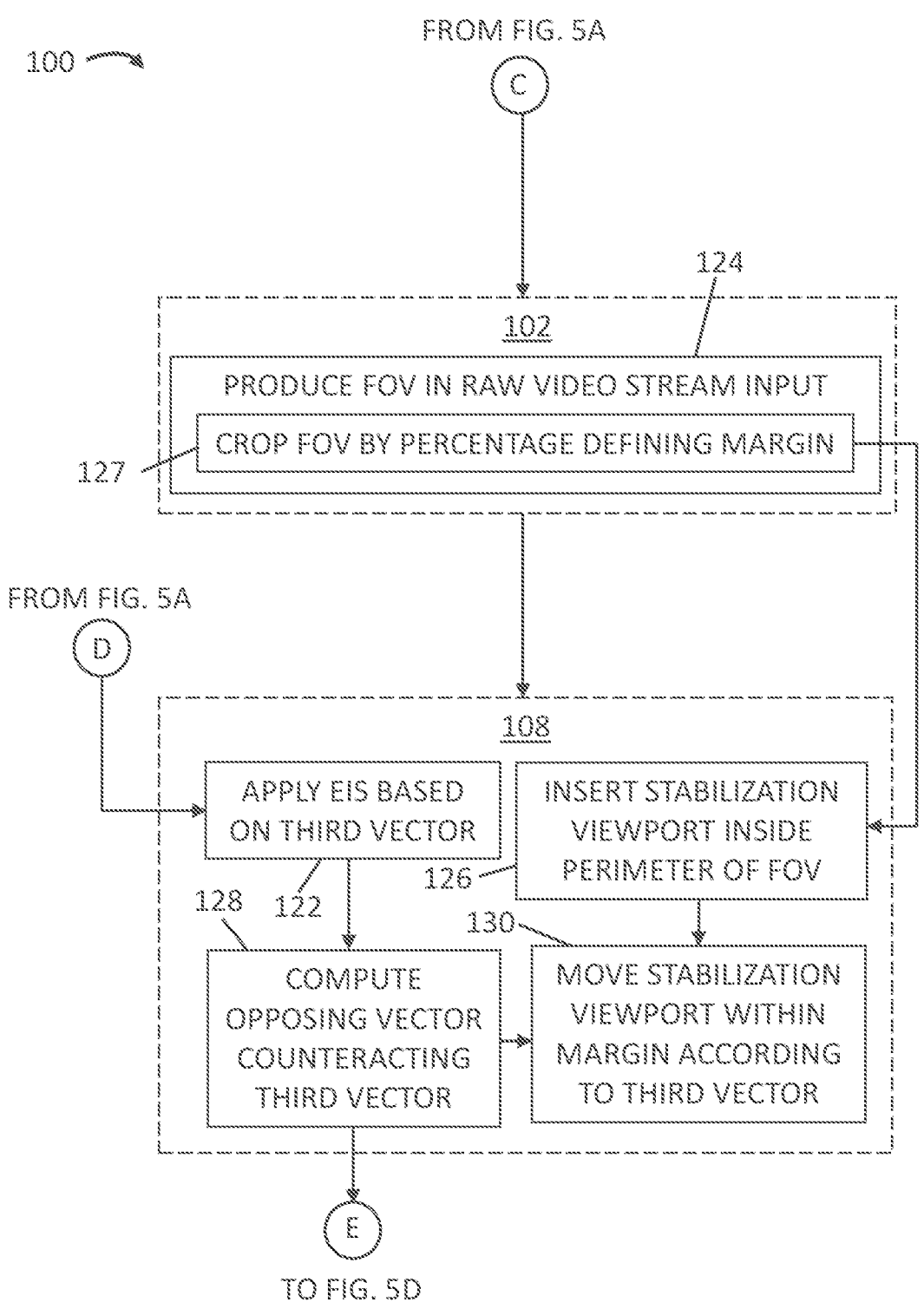

Referring now to FIG. 5C, and transitioning thereto from FIG. 5A via the circled letter "D," the capturing 102 step of method 100 may include producing 124 an FOV (e.g., 72-2) in the raw video stream input 7 (e.g., in frames thereof). In some embodiments, producing 124 the FOV in method 100 may include cropping 127 FOV 72-2 by a percentage defining the margin 77 (e.g., 15%). The method 100 step of applying 108 EIS to raw video stream input 7 may further include inserting 126 a stabilization viewport (e.g., 73-2) inside the perimeter of FOV 72-2. In such embodiments of the present technology, the stabilization viewport 73-2 and the perimeter of FOV 72-2 may be separated by margin 72-2.

Still referring to FIG. 5C, and more specifically the transition thereto from FIG. 5A via the circled letter "D," the applying 108 step of method 100 may include applying 122 the EIS further based on the third vector 75. In such embodiments, the method 100 step of applying 108 EIS to raw video stream input 7 may also include computing 128 the opposing vector 76 counteracting the third vector 75, such as in the use case illustrated in FIG. 4. Applying 108 EIS to raw video input stream 7 in method 100 may further include moving 130 stabilization viewport 73-2 within margin 77 according to opposing vector 76 to generate 109 stabilized video stream output 39.

Figure 5D:
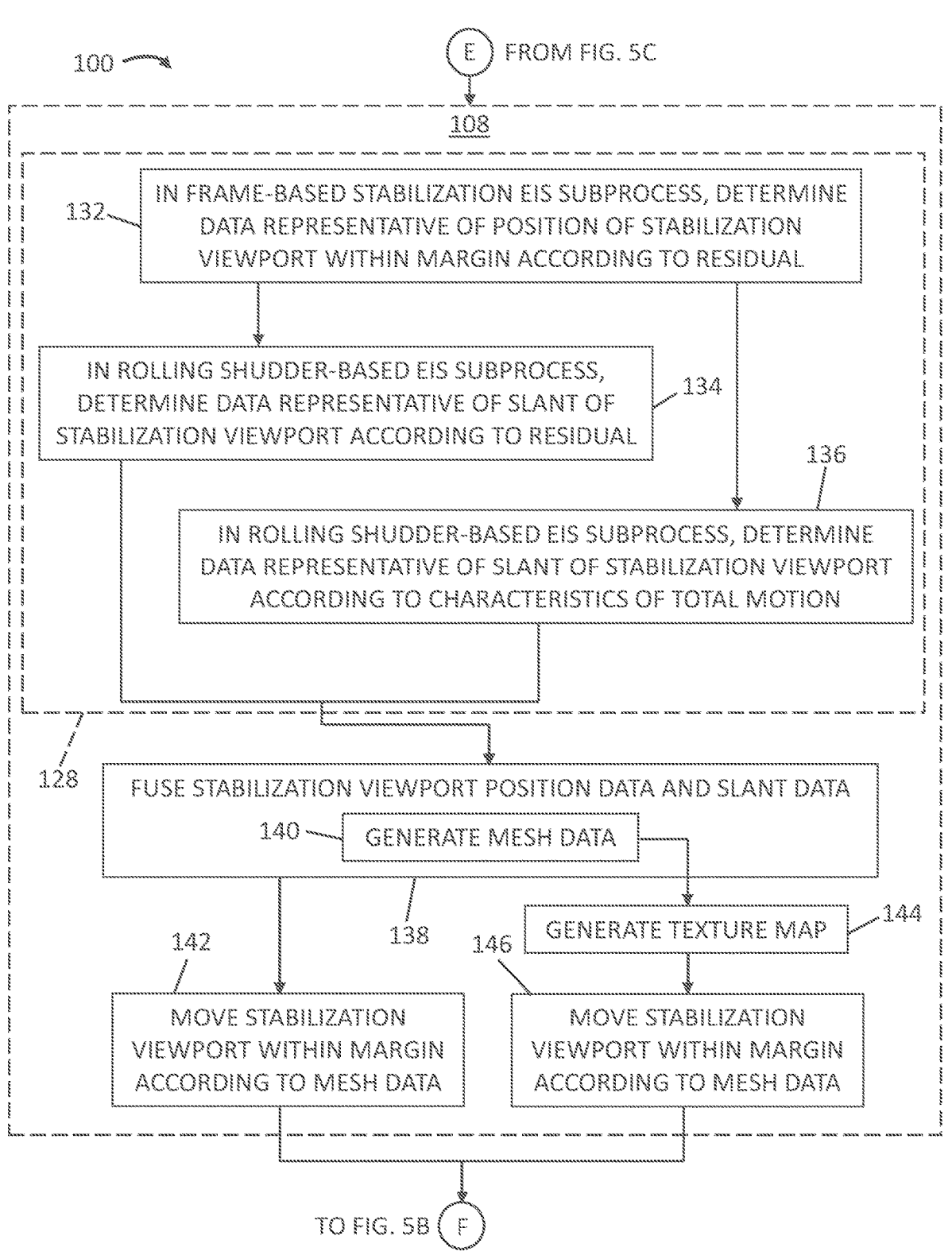

Referring now to FIG. 5D, and transitioning thereto from FIG. 5C via the circled letter "E," the method 100 step of computing 128 the opposing vector 76 may include determining 132, in a frame-based stabilization EIS subprocess (e.g., implemented in software or firmware by module 33, as described above with reference to FIG. 3) and based at least in part on the residual 29 (or residual 31), data 51 representative of a position of stabilization viewport 73-2 within margin 77. From the determining 132 step, method 100 may take one of two alternative processing paths.

In some embodiments, the method 100 of computing 128 opposing vector 76 may include determining 134, in a rolling shudder-based stabilization subprocess (e.g., implemented in software or firmware by module 35, as described above with reference to FIG. 3) and based at least in part on the data representative of the residual 29, data 52 representative of at least one slant property 79 of stabilization viewport 73-2. During operation of UAV 2 system 1 in this embodiment, IMU 3, motion planner 17, frame-based stabilization 33 and rolling shudder stabilization 35 modules function to provide a data flow path 81 including subtractor module 5.

In other embodiments, the method 100 of computing 128 opposing vector 76 may alternatively include determining 136, in a rolling shudder-based stabilization subprocess (e.g., implemented in software or firmware by module 35, as described above with reference to FIG. 3) and based at least in part on the data representative of the residual 31, data 52 representative of the at least one slant property 79 of stabilization viewport 73-2. During operation of UAV 2 system 1 in this embodiment, IMU 3, motion planner 17, frame-based stabilization 33 and rolling shudder stabilization 35 modules function to provide a data flow path 83 including subtractor module 41.

The method 100 step of applying 108 EIS to the raw video stream input 7 may also include fusing 138 the data 51 representative of a position of stabilization viewport 73-2 within margin 77 with the data 52 representative of the one or more slant properties of stabilization viewport 73-2 to generate 140 mesh data 27—or a signal encoding it— resulting from the fusing 138. In some embodiments, the fusing 138 step is performed after either of the determining 134 step, or the determining 136 step, of method 100.

Still referring to FIG. 5D, the method 100 step of moving 130 the stabilization viewport 73-2 may include moving 142 the stabilization viewport 73-2 within the margin 77 further according to the mesh data 27. In some embodiments, applying 108 EIS to raw video stream input 7 may also include generating 144 data 54 representative of the texture map for the stabilization viewport 73-2 according to the mesh data 27. In those embodiments, moving 130 the stabilization viewport 73-2 comprises moving 146 the stabilization viewport 73-2 further according to the texture map data 54.

Figure 6:
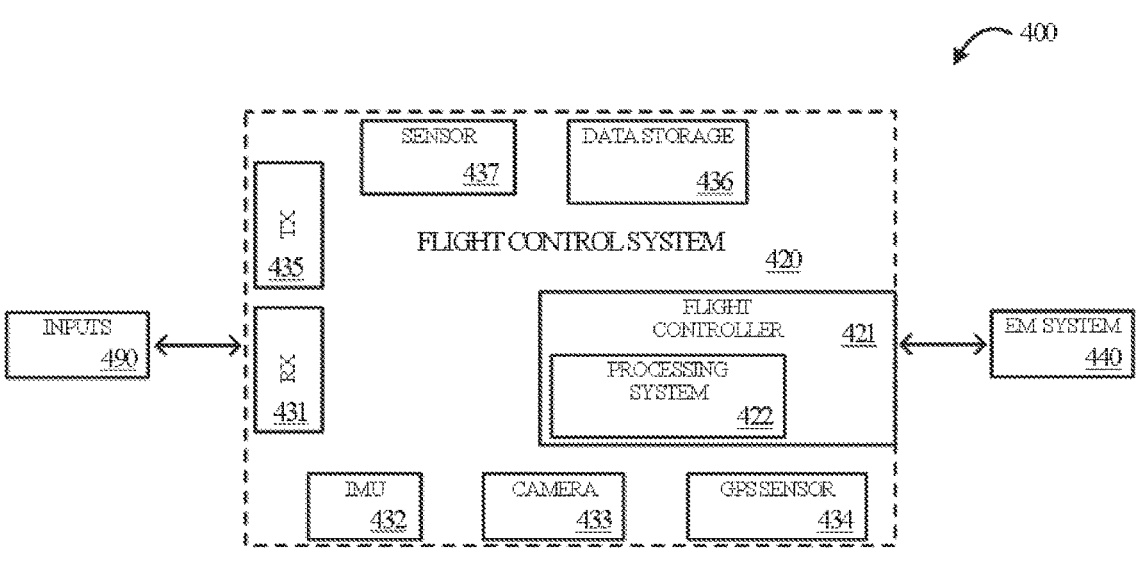
FIG. 6 depicts a systems architecture of a UAV in an implementation.

FIG. 6 depicts a systems architecture 400 of a UAV, such as UAV 2, in an implementation. Systems architecture 400 includes flight control system 420, electromechanical system 440, and operational inputs 490. Flight control system 420 comprises one or more receivers RX 431 for receiving operational inputs 490, such as wireless network communication or flight commands from a remote control device (e.g., ground station 22). Flight control system 420 further comprises flight controller 421, inertial measurement unit (IMU) 432, camera 433, GPS sensor 434, transmitter TX 435, and data storage 436. Data storage 436 includes persistent or nonvolatile memory or a removable memory card (e.g., an SD card) for recording flight and sensor data gathered from onboard devices, including photos or video captured by onboard cameras, or for storing programmed flight programs for use by the UAV. Flight control system 420 may also comprise one or more other sensors 437 such as barometers, altimeters, additional cameras, heat-detecting sensors, electromagnetic sensors (e.g., infrared or ultraviolet), compasses, anemometers or wind sensors, magnetometers, and so on. Onboard camera 433 comprises a device for capturing imaging data, such as video or still photography, across visible and other wavelengths of the electromagnetic spectrum, such as ultraviolet or infrared wavelengths.

Electromechanical system 440 provides the propulsion for the UAV, typically comprising an electronic speed controller which throttles one or more rotors according to flight instructions received from flight control system 420. It may be appreciated that both flight control system 420 and electromechanical system 440 can include other elements in addition to (or in place of) those disclosed herein, which are illustrated for exemplary purposes.

Figure 7:
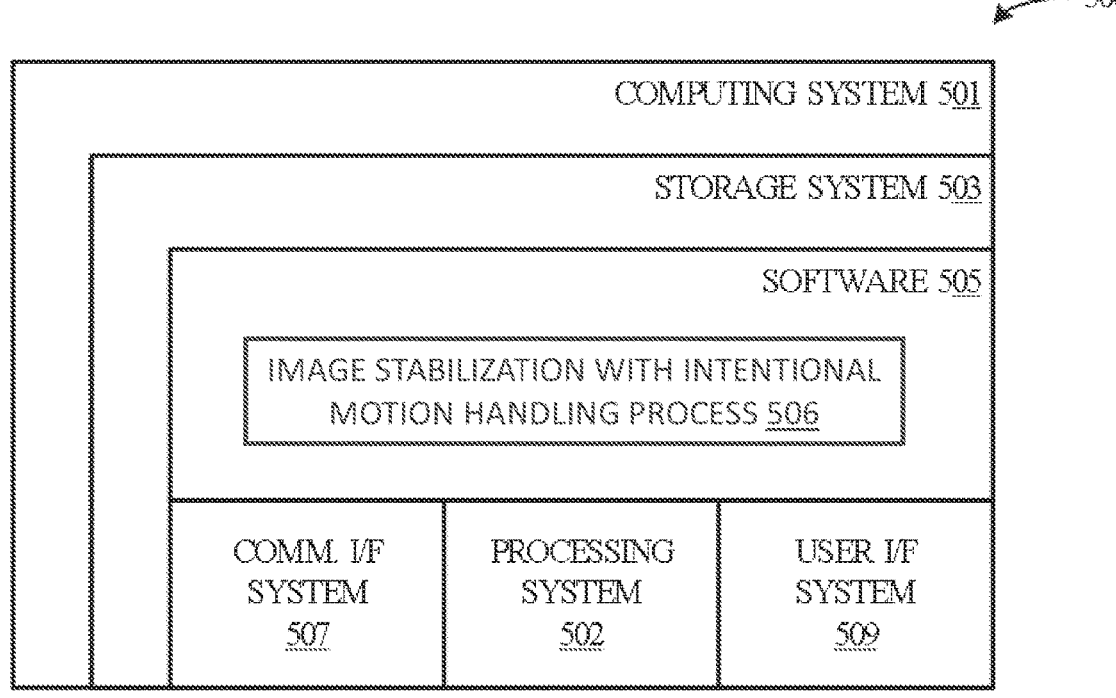
FIG. 7 depicts a block diagram of a computing system suitable for implementing the various operational environments, architectures, processes, scenarios, and sequences discussed below with respect to the other figures.

FIG. 7 depicts a block diagram of a computing system 500 suitable for implementing the various operational environments, architectures, processes, scenarios, and sequences discussed below with respect to the other figures. Computing system 500 may include a computing device 501 that is representative of any system or collection of systems in which the various processes, programs, services, and scenarios disclosed herein may be implemented. Examples of computing device 501 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 501 may be implemented as a single apparatus, system, or device or may be implemented in a distributed manner as multiple apparatuses, systems, or devices. Computing device 501 includes, but is not limited to, processing system 502, storage system 503, software 505, communication interface system 507, and user interface system 509 (optional). Processing system 502 is operatively coupled with storage system 503, communication interface system 507, and user interface system 509.

Processing system 502 loads and executes software 505 from storage system 503. Software 505 includes and implements image stabilization with intentional motion handling process 506, which is representative of the UAV-related processes described above according to the present technology with respect to the preceding figures, such as method

100. When executed by processing system 502, software 505 directs processing system 502 to operate as described herein for at least the various processes, operational scenarios, and sequences discussed in the foregoing implementations. Computing device 501 may optionally include additional devices, features, or functionality not discussed for purposes of brevity.

Referring still to FIG. 7, processing system 502 may comprise a micro-processor and other circuitry that retrieves and executes software 505 from storage system 503. Processing system 502 may be implemented within a single processing device but may also be distributed across multiple processing devices or sub-systems that cooperate in executing program instructions. Examples of processing system 502 include general purpose central processing units, graphical processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 (including image stabilization with intentional motion handling process 506) may be implemented in program instructions and among other functions may, when executed by processing system 502, direct processing system 502 to operate as described with respect to the various operational scenarios, sequences, and processes illustrated herein. For example, software 505 may include program instructions for implementing the UAV task planning processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtualization software, or other application software. Software 505 may also comprise firmware or some other form of machine-readable processing instructions executable by processing system 502.

In general, software 505 may, when loaded into processing system 502 and executed, transform a suitable apparatus, system, or device (of which computing device 501 is representative) overall from a general-purpose computing system into a special-purpose computing system customized to support sensor device deployments and swaps. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary, etc.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 501 and other computing systems (e.g., ground station 22), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology may be presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating an unmanned aerial vehicle (UAV), the method comprising:

capturing a raw video stream input using one or more camera sensors of the UAV;

quantifying characteristics of motion of the UAV as commanded by a user of the UAV;

quantifying characteristics of total motion of the one or more camera sensors including the motion commanded by the user;

subtracting the characteristics of the motion commanded by the user from the characteristics of the total motion to generate data representative of a residual; and applying electronic image stabilization (EIS) to the raw video stream input based at least in part on the signal encoding data representative of the residual to generate a stabilized video stream output.

2. The method of claim 1 further comprising receiving, by the UAV, a signal encoding data representative of the characteristics of motion of the UAV as commanded by the user.

3. The method of claim 2, wherein quantifying characteristics of the motion commanded by the user comprises quantifying characteristics of the user-commanded motion according to the data representative of the characteristics of motion commanded by the user.

4. The method of claim 1, wherein quantifying characteristics of the motion commanded by the user comprises computing a first vector representative of the user-commanded motion.

5. The method of claim 4, wherein quantifying characteristics of the total motion of the one or more camera sensors comprises computing a second vector representative of the characteristics of the total motion.

6. The method of claim 5, wherein subtracting the characteristics of the user-commanded motion from the characteristics of the total motion comprises subtracting the first vector from the second vector to generate data further representative of a third vector defining the residual of the subtracting.

7. The method of claim 6, wherein applying EIS to the raw video stream input comprises applying the EIS further based on the third vector.

8. The method of claim 7, wherein capturing the raw video stream input comprises producing a field of view (FOV) in the raw video stream input, wherein applying EIS to the raw video stream input further comprises inserting a stabilization viewport inside a perimeter of the FOV, and wherein the stabilization viewport and the perimeter of the FOV are separated by a margin.

9. The method of claim 8, wherein producing the FOV comprises cropping the FOV by a percentage defining the margin.

10. The method of claim 8, wherein applying EIS to the raw video stream input further comprises computing an opposing vector counteracting the third vector.

11. The method of claim 10, wherein applying EIS to the raw video stream input further comprises moving the stabilization viewport within the margin according to the opposing vector to generate the stabilized video stream output.

12. The method of claim 11, wherein computing the opposing vector comprises determining, in a frame-based stabilization EIS subprocess and based at least in part on the data representative of the residual, data representative of a position of the stabilization viewport within the margin.

13. The method of claim 12, wherein computing the opposing vector further comprises determining, in a rolling shudder-based stabilization subprocess and based at least in part on the data representative of the residual, data representative of a slant property of the stabilization viewport.

14. The method of claim 12, wherein computing the opposing vector further comprises determining, in a rolling shudder-based stabilization subprocess and based at least in part on data representative of the characteristics of the total motion, data representative of a slant property of the stabilization viewport.

15. The method of claim 13, wherein applying EIS to the raw video stream input further comprises fusing the data representative of a position of the stabilization viewport within the margin and the data representative of a slant property of the stabilization viewport to generate mesh data.

16. The method of claim 15, wherein moving the stabilization viewport comprises moving the stabilization viewport within the margin further according to the mesh data.

17. The method of claim 15, wherein applying EIS to the raw video stream input comprises generating data representative of a texture map for the stabilization viewport according to the mesh data, and wherein moving the stabilization viewport comprises moving the stabilization viewport further according to the texture map.

18. The method of claim 1 further comprising transmitting a signal encoding data representative of the stabilized video stream output to a ground station communicably coupled to the UAV.

19. A system for operating an unmanned aerial vehicle (UAV), the system comprising:

one or more camera sensors for capturing a raw video stream input; and at least one computing device disposed onboard the UAV and operably coupled to the one or more camera sensors, the at least one computing device configured to:

quantify characteristics of motion of the UAV as commanded by a user of the UAV;

quantify characteristics of total motion of the one or more camera sensors including the motion commanded by the user;

subtract the characteristics of the motion commanded by the user from the characteristics of the total motion to generate data representative of a residual; and apply electronic image stabilization (EIS) to the raw video stream input based at least in part on the data representative of the residual to generate a stabilized video stream output.

20. One or more non-transitory computer readable media having stored thereon program instructions which, when executed by at least one processor, cause an unmanned aerial vehicle (UAV) to:

quantify characteristics of motion of the UAV as commanded by a user of the UAV;

quantify characteristics of total motion of the one or more camera sensors including the motion commanded by the user;

subtract the characteristics of the motion commanded by the user from the characteristics of the total motion to generate data representative of a residual; and apply, based at least in part on the data representative of the residual, electronic image stabilization (EIS) to a raw video stream input captured by one or more camera sensors of the UAV to generate a stabilized video stream output.

* * * * *